United States Patent [19]

Solbakken et al.

[11] 4,284,616

[45] * Aug. 18, 1981

[54] PROCESS FOR RECOVERING CARBON BLACK AND HYDROCARBONS FROM USED TIRES

[75] Inventors: Age Solbakken, Montgomery; Fred P. Apffel, Houston; Sam P. Robinson, Houston; Bobby L. Hayes, Houston, all of Tex.

[73] Assignee: Intenco, Inc.

[*] Notice: The portion of the term of this patent subsequent to Feb. 10, 1998, has been disclaimed.

[21] Appl. No.: 3,655

[22] Filed: Jan. 15, 1979

Related U.S. Application Data

[63] Continuation-in-part of Ser. No. 878,088, Feb. 15, 1978.

[51] Int. Cl.$^3$ .................... C01B 31/02; C01B 31/00; C09C 1/48
[52] U.S. Cl. .................... 423/461; 423/445; 423/449; 585/241; 201/2.5; 201/25
[58] Field of Search ............... 423/445, 448, 449, 450, 423/453, 461; 201/2.5, 21, 25; 202/118; 260/586 PP; 422/150

[56] References Cited

U.S. PATENT DOCUMENTS

| | | | |
|---|---|---|---|
| 3,582,279 | 6/1971 | Beckman et al. | 210/2.5 |
| 3,674,433 | 7/1972 | Wyatt | 423/450 |
| 3,772,242 | 11/1973 | Liska et al. | 423/449 |
| 3,823,224 | 7/1974 | Laman et al. | 423/445 |
| 3,966,487 | 6/1976 | Crane et al. | 423/449 |
| 3,996,022 | 12/1976 | Larsen | 423/453 |
| 4,038,100 | 7/1977 | Habernan | 423/445 |
| 4,084,521 | 4/1978 | Herbold et al. | 202/118 |
| 4,098,649 | 7/1978 | Redker | 201/25 |
| 4,108,730 | 8/1978 | Chen | 201/2.5 |
| 4,123,332 | 10/1978 | Rotter | 201/25 |

*Primary Examiner*—O. R. Vertiz
*Assistant Examiner*—Gregory A. Heller
*Attorney, Agent, or Firm*—David M. Ostfeld

[57] ABSTRACT

The invention is a process for economically recovering carbon black, oil and fuel gas from used tires. Used tires are physically fragmented. The fragments are pyrolized at slightly subatmospheric pressure in a reactor while process char is being recycled to increase heat transfer and avoid coke on heat transfer surfaces. Entrained char is separated from the vapor phase products of the pyrolysis, and the vapor phase products of the pyrolysis are then fractionated into oil and fuel gas. A preferred embodiment condenses reactor vapors in two stages at two temperature levels to separate dust from an oil-dust mixture, without water in the first stage and light oil in the second stage. The fuel gas can be compressed and burnt to provide process heat. The entrained char dust and some heavy oil is returned to the reactor. Solid phase pyrolysis products are stripped of trash and milled to carbon black. Carbon black is mechanically separated from the effluent air stream of the mill and formed into pellets with added water and dried.

37 Claims, 6 Drawing Figures

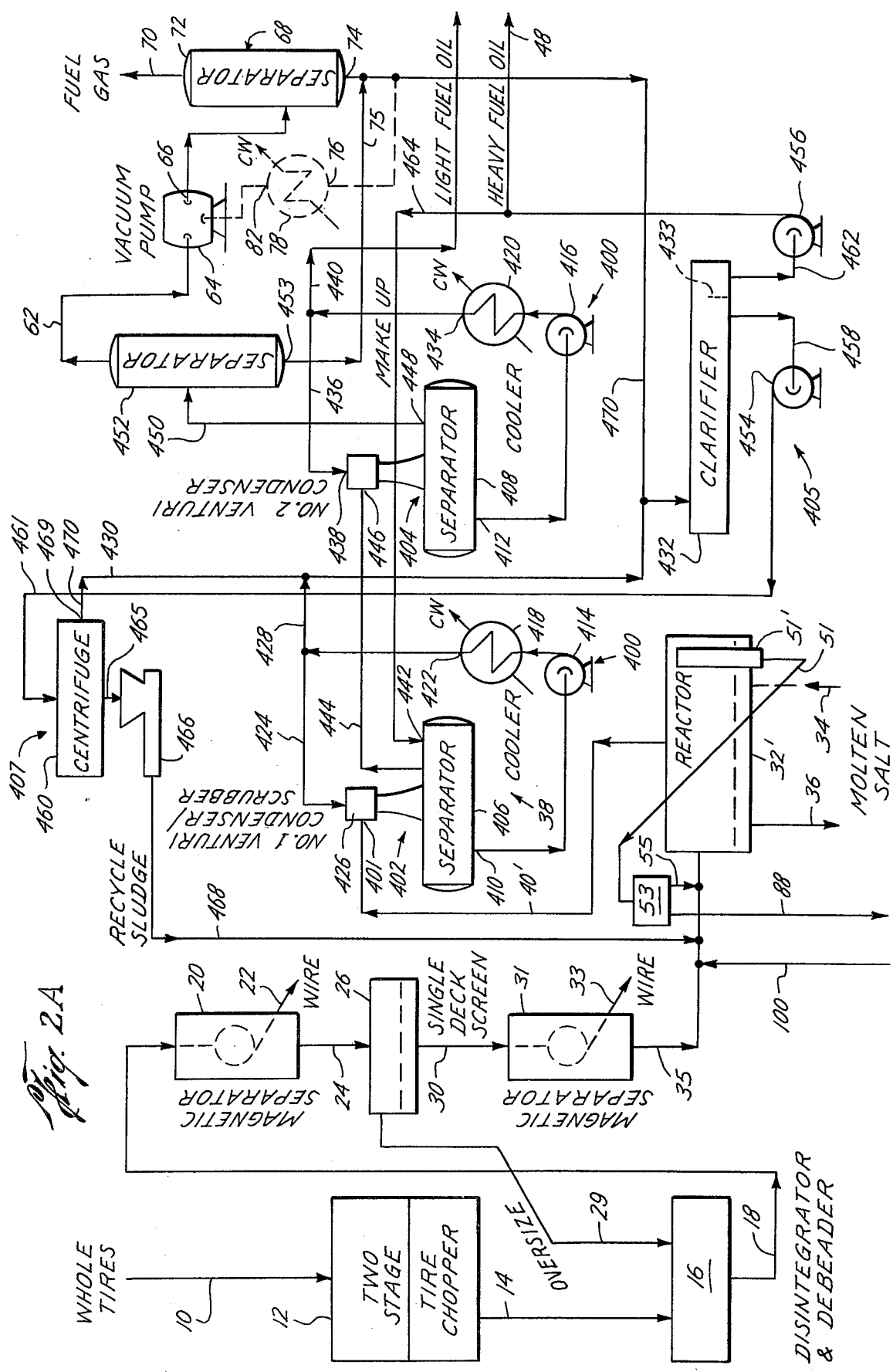

PROCESS FOR RECOVERING CARBON BLACK AND HYDROCARBONS FROM USED TIRES

REFERENCE TO RELATED APPLICATIONS

This application is a continuation-in-part of our co-pending U.S. Patent Application Ser. No. 878,088, filed Feb. 15, 1978, entitled "Process For Recovering Carbon Black and Hydrocarbons From Used Tires". The foregoing application is assigned to the owner of the present application. Applicants claim the priority of their aforementioned United States of America application Ser. No. 878,088, filed Feb. 15, 1978.

FIELD OF THE INVENTION

The invention relates generally to processes for economically recovering carbonaceous materials from used vulcanized articles. More specifically it relates to an economical pyrolysis process for recovering carbon black, fuel oil, fuel gas and steel from used tires.

BACKGROUND OF THE PRIOR ART

Passenger cars and trucks on U.S. highways wear out tens of millions of tires each year. Disposal of these used tires has become a major environmental problem. A high proportion 25%-35% of the weight of a used tire consists of carbon black reinforcing of the rubber in both the tread and sidewalls. This carbon black is prepared by conventional carbon black production processes and comprises individual particles one micron or less in diameter. Fifty to sixty percent (50%-60%) of the weight of a discarded tire is butadiene-styrene copolymer rubber. Tires also contain certain amounts of oil and significant quantities of steel wire and/or fiberglass or polyester cord. All of these components are expensive and require large amounts of energy in their manufacture. A process that would allow economic recovery of these materials from the huge stocks of used tires piling up around the country would be very desirable. Unfortunately, the very characteristics that makes tires long-lasting and safe on the road, i.e., durability, resistance to puncture and slicing, and resistance to decomposition at moderate temperatures, combine to make tires exceptionally difficult to recycle.

The prior art teaches that rubber can be pyrolyzed in the absence of air at temperatures of between 842° and 1112° Fahrenheit in laboratory equipment to produce oil, gas and a solid residue that is carbonaceous in nature. Large electrically heated sink reactors and Dewar flasks have been used for obtaining test data.

The prior art also teaches some pilot plants that were built to carry tire processing schemes into the commercial world. Circulating heated ceramic balls have been used as a direct source of reaction heat. The balls are heated externally, mixed with rubber feed chips, discharged, screened, reheated and recycled. These reactions take place substantially at atmospheric pressure. Other pilot plants have been designed which make the carbonaceous solid phase of tire pyrolysis into fuel briquets. These fuel briquets are much less valuable than the carbon black produced by the present invention. Still other batch pilot plants have been built in which the tires are indirectly heated through the tray walls of multi-tray reactors to temperatures of between 1400° and 1600° Fahrenheit. At these temperatures, heavy oils and tar products can be recycled for further cracking to improve carbon black yields. Other batch and continuous type process plants have been built that depend on indirect heating through the walls of a jacketed screw reactor from a high temperature molten salt heat sink. These reactors do not have hollow shafts nor hollow flights and have far less heat transfer area than the present invention.

When heating rubber as for instance chips for tires, the rubber at certain temperature, usually 400°-500° F. start to devulcanize and one gets a soft slicky phase which adheres to most known heat transfer surfaces reducing heat transfer and making a continuous operation difficult.

The present invention overcomes this difficulty with a novel approach which is not taught in the prior art.

It is extremely difficult to physically break tires apart to obtain individual rubber particles free of reinforcing materials. This is particularly true when, as in the prior art, indirectly heated reactors must transfer heat from a heat source to solid tire particles through a wall. Commercially available tire disintegrators include slicing machines, hammer mills, debeaders and manglers that have been adapted to tire reduction from other industries.

The recent introduction of steel reinforcing in both passenger and truck tires has greatly increased the difficulty and expense of sufficiently disintegrating a tire to convert it into a useable pyrolysis feed stock.

Aside from the purely physical problems associated with breaking down used tires before they can be pyrolized, the prior art also teaches that vapors produced from tire pyrolysis are loaded with dusty unburned rubber and carbon black particles. These particles plug vapor lines, coolers, condensers, and generally gum up equipment. Further, some of the heavier hydrocarbons driven off during pyrolysis is composed of tar and pitch. These high melting point fractions solidify quickly, especially in the presence of dust and fiber glass and again generally gum up downstream processing equipment. If the tires are wet, as happens when they are washed with water to remove accumulated dust and mud, the water vapor distills and forms emulsions with the heavy oils and tars. Tire pyrolysis oils are also contaminated with metals and solids carryover. This causes them to have greatly reduced value as fuel oils. The high degree of metallic impurities also causes significant problems to be associated with the use of these hydrocarbons for fuel.

The present invention overcomes the physical difficulties of the prior art in making clean oils and overcome the problems with the condensation of the vapors.

Solid phase pyrolysis reaction produces taught by the prior art include partially decomposed rubber, carbon black particles, fiberglass, steel wires, metallic oxide ashes and dust. The prior art has never taught any satisfactory way of converting this conglomerate carbonaceous mixture into a clean fuel. It is even more difficult to convert such a mixture of components into saleable carbon black, which would yield much greater economic returns. Because of these difficulties and the environmental restraints placed on such recovery processes, the prior art does not teach a pyrolysis system for the conversion of vehicle tires to saleable carbon black and hydrocarbons.

To produce commercial carbon black from tires, one has to use a very controlled temperature of the pyrolysis process. Haphazard changes or systems where the temperature cannot be well controlled will lead to intolerable variances in the carbon black produced.

The present invention overcomes this difficulty in a novel way not taught by the prior art.

It is an object of the present invention to teach a method of and teach apparatus for pyrolyzing used tires economically into commercial quantities of oil and fuel gas.

It is yet another object of the present invention to teach a method of pyrolyzing used tires that is energy efficient and generates all the fuel gas necessary to operate the process within environmental regulations from the process itself.

It is yet another object of the present invention to teach a method of and teach apparatus for pyrolyzing used tires economically into commercial quality and quantities of carbon black.

BRIEF DESCRIPTION OF THE INVENTION

The invention is a process for economically pyrolizing used tires into commercial quantities of carbon black, fuel oils and fuel gas.

In one embodiment, used tires are physically sliced into small pieces in a relatively low energy two-stage parallel knife and anvil slicer. The tire slices are then disintegrated in a relatively energy intensive secondary disintegrating mill (cracker mill) to separate reinforcing materials, such as steel wire and fiberglass, from the rubber of the tire body and to provide small fragments that are approximately one-half inch to one and a half inches across for pyrolysis.

These smaller fragments are magnetically separated from loosened steel wire and introduced by a screw conveyor through a rotary air lock into a pyrolysis reaction vessel. In a preferred embodiment, used tires are cut by commercially available tire-shredding systems into pieces not larger than 1 to 2 square inches and introduced through an air-lock into a pyrolysis reaction vessel. The reactor is a vessel having an internal rotating hollow shaft with appendages. The reactor is indirectly heated through the shaft and its appendages by molten salt or other suitable mixtures introduced into the rotating equipment through the shaft at a temperature above 750° Fahrenheit.

The fragments are pyrolyzed at approximately 850° to 1050° Fahrenheit for 30 to 10 minutes under an oxygen limited, hydrocarbon vapor atmosphere at about 6 to 22 PSIA. Exposure to this temperature and pressure causes the tire fragments to separate into a carbonaceous solid phase and a hydrocarbon vapor phase contaminated with dust.

In one embodiment, the vapor phase rises through a tar scrubber, which removes dust, into a condenser. High boiling point liquids are condensed out by indirect heat exchange with water or air or other suitable media, and a portion of the condensate is refluxed back through the tar scrubber into the solid carbonaceous phase in the reactor, creating a liquid phase.

The presence of this liquid condensate in the carbonaceous reaction product, however, causes a resistant, insulating coating to form on portions of the appendages which decreases the heat transfer. Accordingly, this embodiment is not preferred.

In the preferred embodiments the vapor phase rises through a hood in the reactor to a direct contact scrubber, which also acts as a direct contact condenser operated at such high temperature that water is not condensed as a mixture of oil, water and dust is extremely difficult to separate. The dust laden condensate is then transported to a clarifier or disengaging vessel which collects this condensate and where the dust can settle to the bottom. The remainder of the vapor phase is cooled to condense light oil, which is subsequently separated from residual gas by-products. These gas by-products can be compressed and burned to provide process heat as well as part of the condensed oil. The inlet condensate to the clarifier would contain about three percent (3%) char by weight the dust settles to the bottom of the clarifier. The output of the clarifier system is split into three streams. A first stream is recycled to the scrubber mechanism as at least part of the wash fluid. A second stream may be sent to storage as heavy fuel oil. The first and second stream outputs of the clarifier may be passed through indirect heat exchange. A third stream from the bottom of the clarifier is centrifuged at over two thousand times gravity and preferably over three thousand times gravity by a continuous centrifuge or other suitable filter which separates the stream into a cleaner, heavy oil stream and a heavy thixotropic sludge, approximately thirty-three percent (33%) carbon black solids by weight. The thixotropic sludge is pumped by a screw pump, such as a Moyno pump, or other suitable conveyor back into the feed end of the reaction vessel. It is also known in the prior art to have one or more clarifiers where further sedimentation can be achieved without the use of a centrifuge. With differing sedimentation times, a wide range of differing concentrations may be achieved. Thus, the bottom of the clarifier could be pumped to a second vessel where further sedimentation of the sludge may be done which can be recycled directly to the inlet end of the reactor without the use of a centrifuge. This heavy slurry may also be thinned, if desired, by recycling a portion of the condensed, light oil to the suction of the Moyno pump. The clean, heavy oil stream is recycled to the disengaging vessel.

After cooling, the remaining wire is then magnetically separated from all of the pyrolyzed solid phase. This solid phase is then screened to remove glass. Trash is separated and discarded and larger pieces of pyrolyzed materials recycled to the reaction vessel. In the preferred embodiment, a portion, between ten and eighty percent and preferably forty percent, of the cooled, pyrolized, carbonaceous solid phase is recycled to the reaction vessel. Recycle as great as one-hundred percent would be used during start-up. The char could be introduced into the reactor at any point or points along, preferably, the first half of the length of the reaction vessel. The remaining pyrolyzed solid phase is milled to carbon black in an air swept roller mill.

The effluent air stream from the roller mill is passed through a mechanical separator to remove heavy particles. The carbon black is then separated out by a cyclone separator in series with a bag filter.

The carbon black is wetted, formed into pellets and dried in a drier.

BRIEF DESCRIPTION OF THE DRAWINGS

FIGS. 2A and 2B are a flow diagram of a second embodiment of the present invention.

DESCRIPTION OF THE PREFERRED EMBODIMENT

Figure 1A:
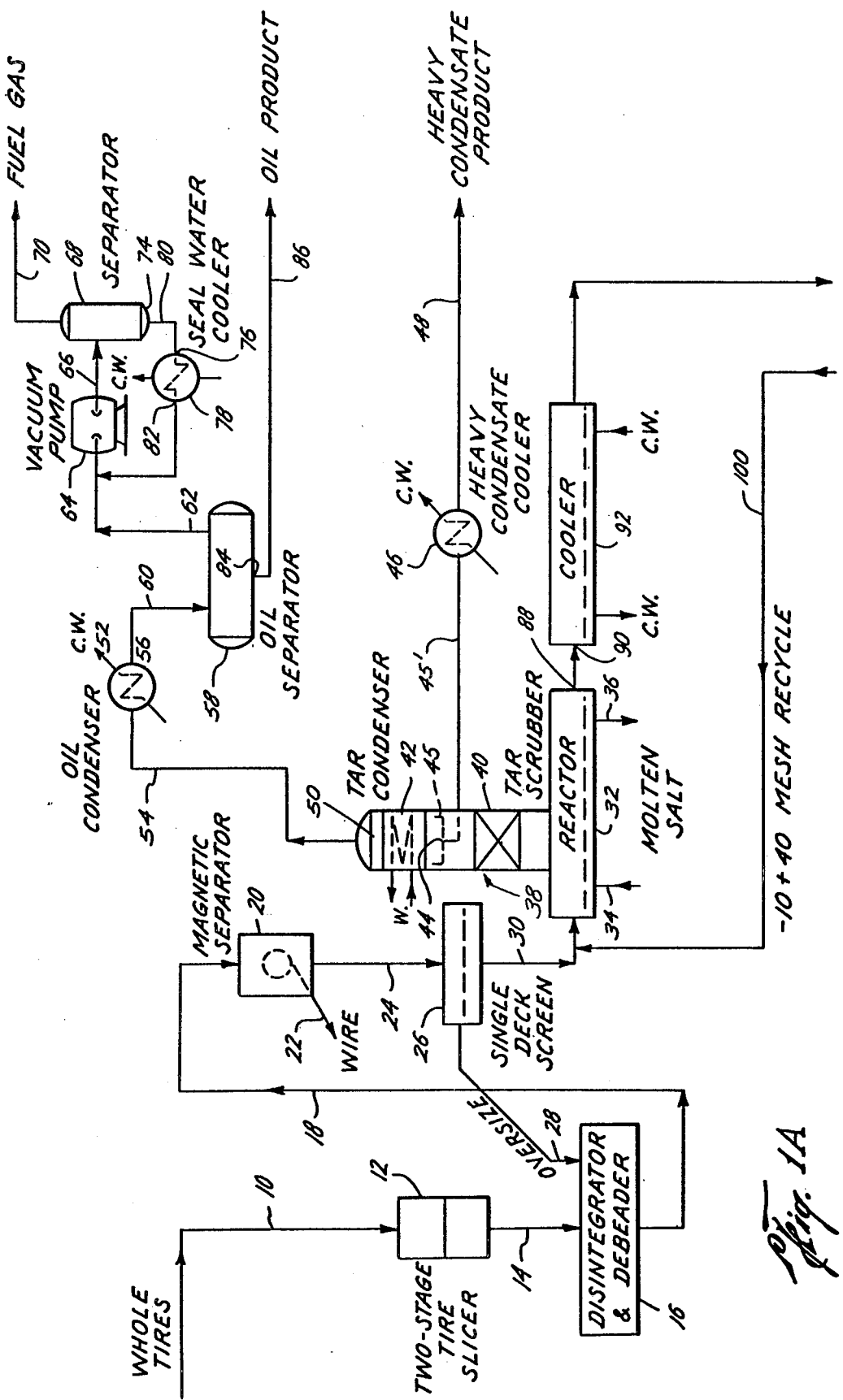
FIGS. 1A and 1B are a flow diagram of a first embodiment of the present invention which shall not be described in great detail since it is not preferred.
Figure 1B:
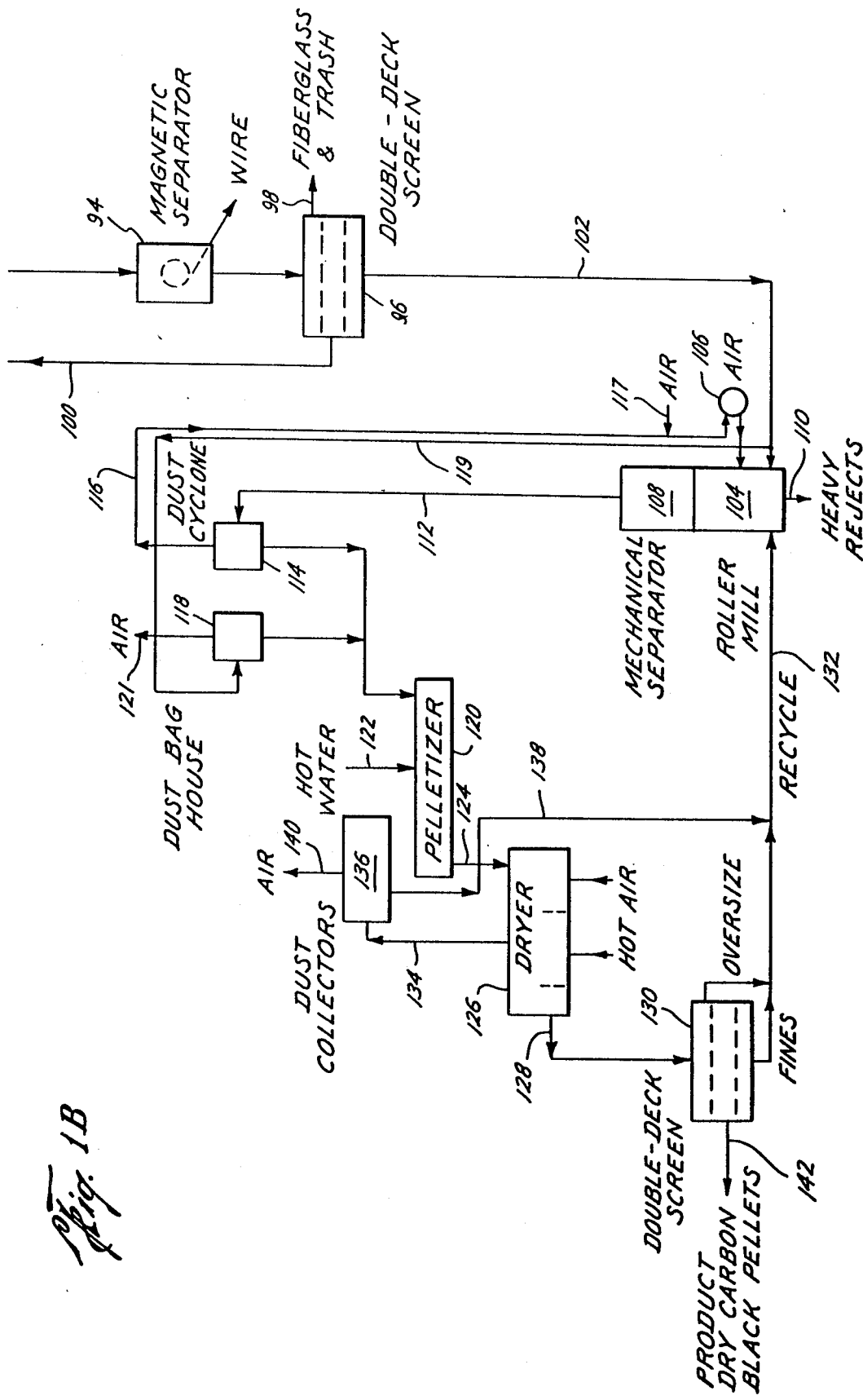
Figure 2B:
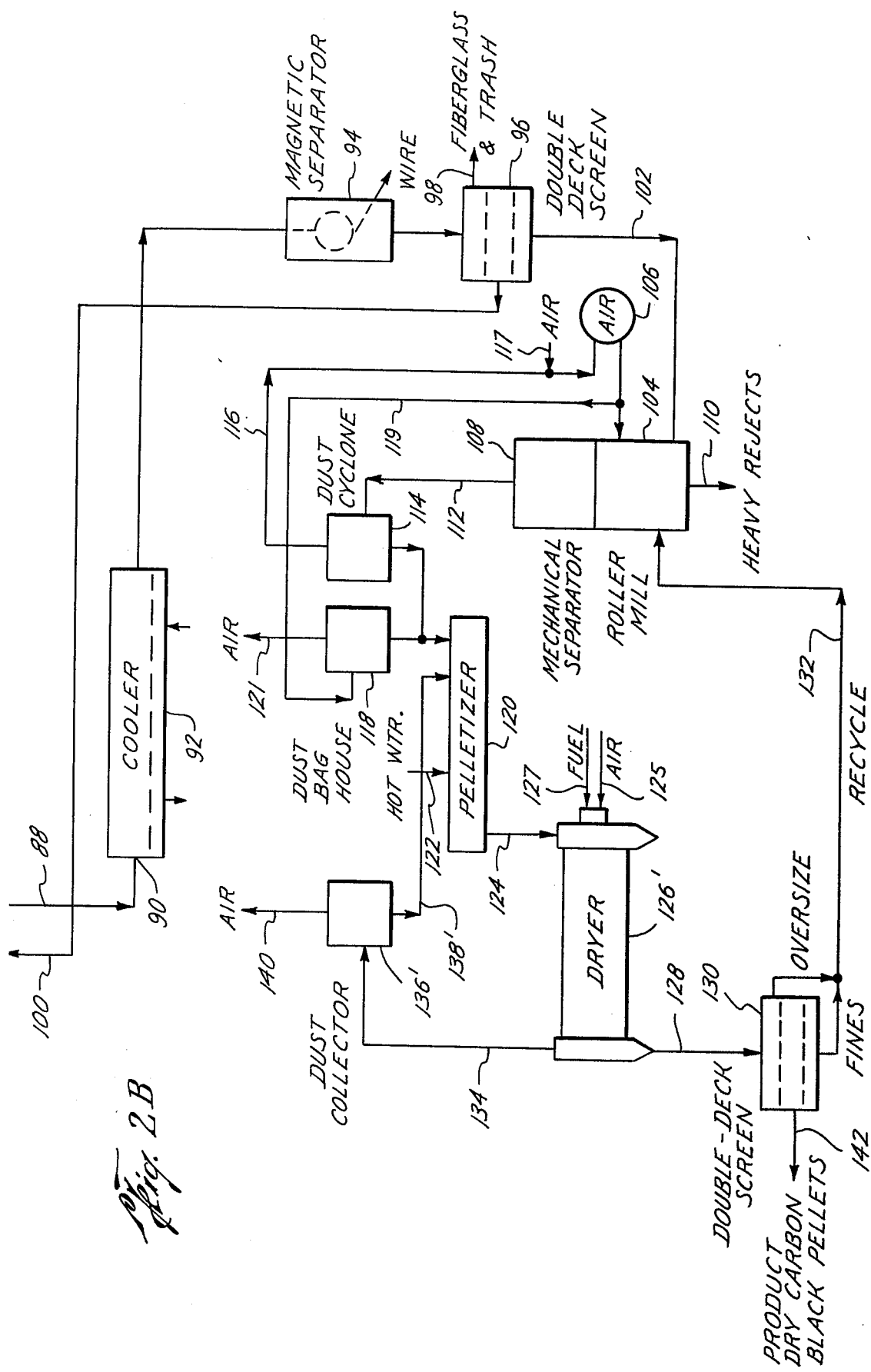
Figure 3A:
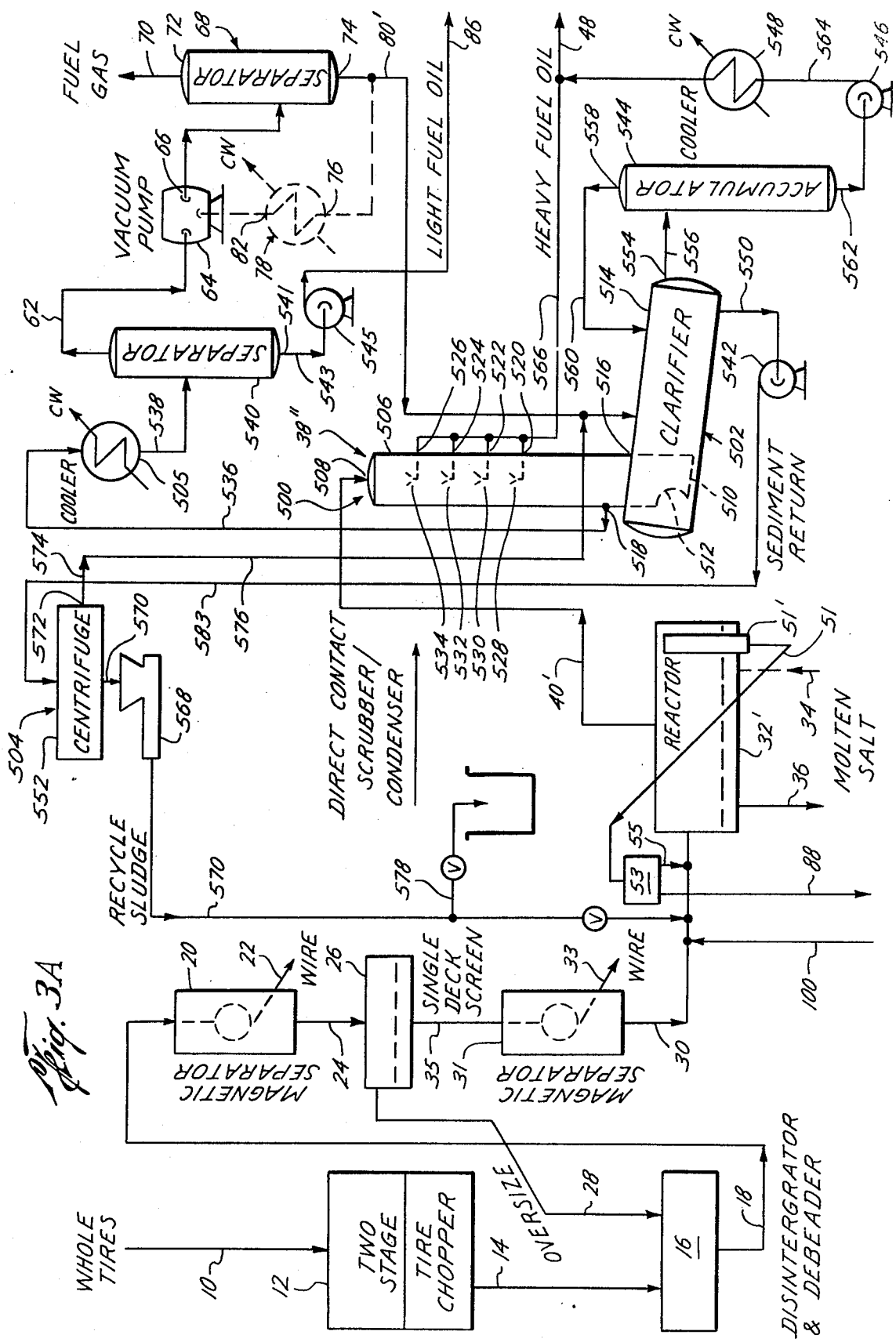
FIGS. 3A and 3B are a flow diagram of a third embodiment of the present invention.
Figure 3B:
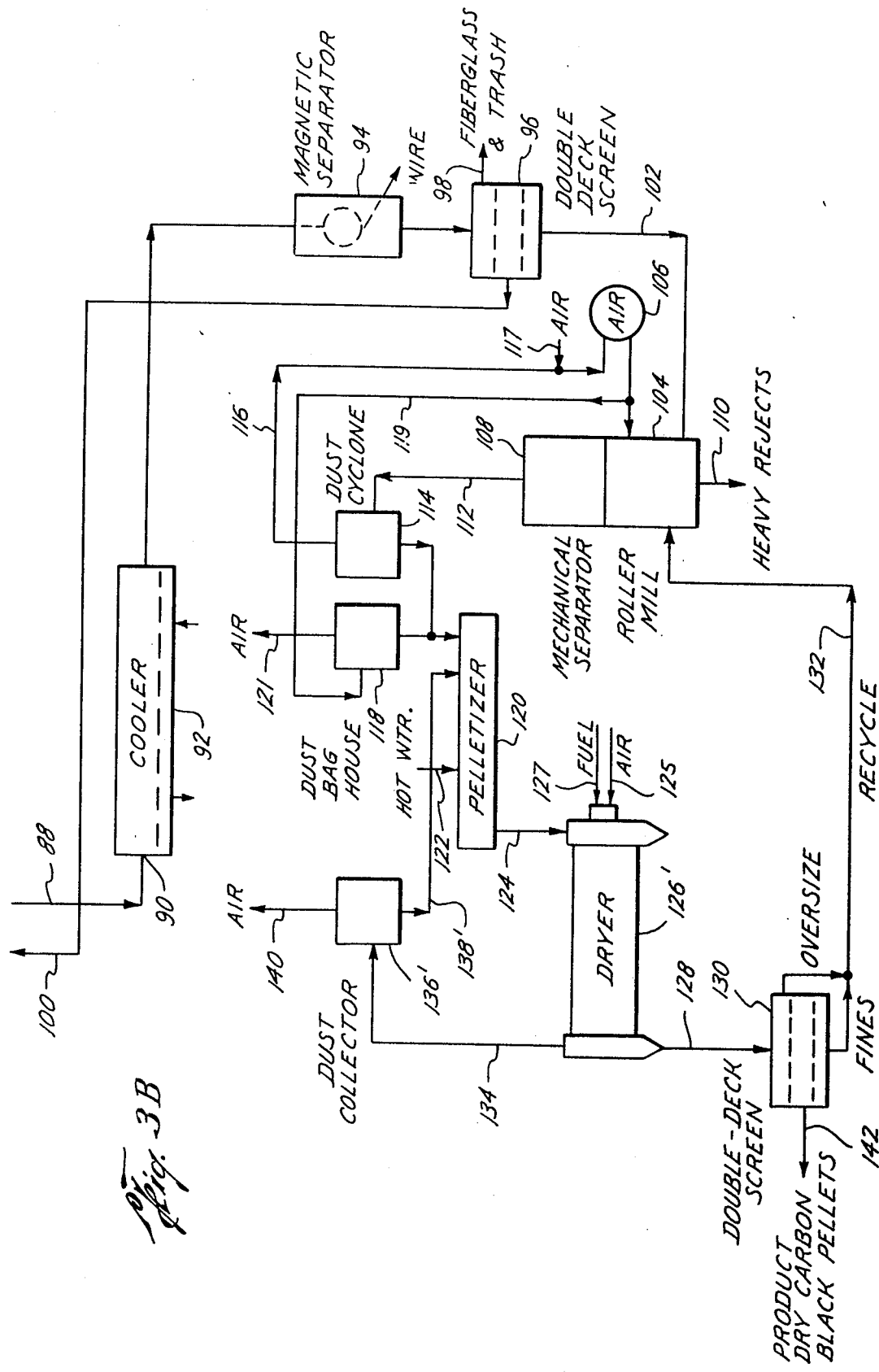

Each of the processes shown schematically in FIGS. 1-3 comprises:
1. The feed preparation section;
2. A reactor/scrubber/condenser section;
3. A vapor recovery system;
4. A solid cleaning section;
5. A char milling and recovery section;
6. A pelletizing and pellet drying section.

These sections will now be discussed in detail.

In the figures, all parts which are substantially alike in description are given identical reference numerals.

I. Feed Preparation Section.

Whole tires at 10 are fed into a commercially available tire shredder 12 which shreds the tires into pieces preferably smaller than 1 to 2 square inches. The shredded material is conveyed to a feed bin 16 from which it is fed to the reactor by a metering screen feeder. This second stage produces smaller slices, approximately 2 inches by 6 inches average size. In the described embodiments of the present invention, this two-stage tire slicer uses a parallel knife and anvil arrangement to completely slice whole tires into small strips because such an arrangement consumes a minimum amount of energy. This first stage of feed preparation does not separate rubber from carcass reinforcing material, but rather slices the whole tire into segments.

II. Reactor/Condenser Section.

In the disclosed embodiments of the present invention, pyrolysis reaction vessel 32 or 32' is a hollow shaft unit having appendages which stir the material in the reactor vessel and cause it to move substantially in one direction through the vessel parallel to the axis of the vessel. The appendages may have vanes with adjustable pitch connected to the appendages. In any of the embodiments, the pyrolysis reaction vessel 32 or 32' may be a hollow shaft, hollow flight unit having a screw type conveyor with a reduced flight pitch. An alternate embodiment could use a hollow shaft, hollow flight screw with square pitched flights to improve backmixing and overall heat transfer. Other alternate embodiments would use one or more vessels, each having an integral rotating hollow shaft and appendages, the reactor being indirectly heated through the shaft and its appendages. Typical reactors of this type are available from several manufacturers but need to be suitably modified for the high temperatures of the process at hand. In the disclosed embodiments of the present invention, the reactor is indirectly heated using a heating media of molten salt introduced into the rotating equipment through the shaft at a temperature above 750° Fahrenheit. This secures an evenly controllable temperature throughout the reactor. It further makes possible a large enough heat transfer surface to secure a product of consistent quality.

Reactor 32 or 32' is heated by indirect heat exchange with molten salt entering through line 34 above, for example, 1000° Fahrenheit and exiting through either rotary joints through line 36 or, preferably, discharging the effluent molten salt into a collector pan with oversized gravity flow return lines 36 to the salt heating system.

Those skilled in the art will recognize that there are several methods of obtaining good mixing and agitation in this general type of reactor. The present invention should not be limited to any particular physical design of reactor. The preferred embodiment of the present invention uses a low melting, high temperature stable eutectic salt mixture for indirect heating of the pyrolysis reaction vessel. This is a commercially available mixture. Other commercially available mixtures could also be used.

In larger plants, it may be desirable to use a two-stage reactor, and the second stage heated to a relatively higher temperature by molten salt. It is also feasible to use multiple parallel screws in the same reaction vessel to obtain greater capacity.

These alternative examples are given merely as illustration and are not intended to limit the scope of this invention.

FIRST EMBODIMENT

As shown in FIGS. 1A and 1B, a tar scrubber/condenser section 38 is in direct fluid communication with pyrolysis reaction vessel 32, forming a part of the wall of vessel 32. Section 38 includes a tar scrubber 40, a liquid condenser 42 and a condensate drain 44. Tar scrubber 40 is located between reaction vessel 32 and condenser 42. Tar scrubber 40 includes packing suitable for contact between the condensate from condenser 42 and the vapor from reaction vessel 32. Condenser 42 includes a heat exchanger that operates by indirect heat exchange with air or water or other suitable media. Tar drain 44 includes tray 45 located between tar scrubber 40 and condenser 42. Drain line 45' connects to the bottom of tray 45 and passes out through the side of scrubber/condenser 38. Drain line 45' is connected to the inlet side of heat exchanger 46. The outlet side of heat exchanger 46 is connected to condensate product line 48. Heat exchanger 46 operates by indirect heat exchange with chilled water or air or other suitable media.

Functionally, during pyrolysis, hydrocarbon vapors separate from the rubber fragments and pyrolysis solids in reaction vessel 32 and rise into tar scrubber/condenser section 38. The hydrocarbon vapors first rise through tar scrubber 40 which acts to trap solid rubber particles and dust entrained in the vapors.

The hydrocarbon vapor phase then passes through heat exchanger/tar condenser 42 which cools the vapor by indirect heat exchange with water or air or other suitable media. This cooling is sufficient to condense high boiling point liquids such as those with a boiling point above 400° Fahrenheit at atmospheric pressure. The condensed liquids are partially returned as condensate which passes through tar scrubber 40 and carries the rubber particles and dust of the vapor back into the reaction vessel 32. In vessel 32, the condensate mixes with and partially dissolves the tire fragments. A portion of the condensate is drawn off through drain 44 and cooled by indirect heat exchange with water, air or other media in cooler 46 before being removed from the system through line 48 as condensate product.

In the first embodiment of the present invention, it has been experimentally determined that the continuous reflux ratio should be from 0.1 to 0.5 volumes of condensate per volume of condensate product withdrawn from the scrubbed condenser 38 and preferably 0.3.

It is believed that the tar condenser/scrubber 38 and its use is unique to the present invention for at least the following reasons:

(1) The condenser/scrubber 38 is an integral part of the reactor;
(2) The refluxed tar condensate is used as the scrubbing media for the tar scrubber, including washing out dust and tar particles from the vapor stream.
(3) Condensation and reflux of heavy boiling condensate within the pyrolysis reaction vessel allows drain 44 to output a separate product stream of high boiling point hydrocarbon condensate without water.

A reflux to bleed off ratio of from 0.1 to 1.0 can easily be maintained by temperature control of the off vapors from the tar condenser.

The draw or bleed off must be cooled before storage.

However, recycling high boiling point product oil condensed at high temperature to the reactor is detrimental to heat transfer from the molten salt to the reactor. The recycling of a portion of the condensed high boiling point product oil (heavy tar) to the reactor reduces heat transfer. The heavy tar balls up with fine char and fiberglass. These balls do not properly de-volatize, become "tacky" and stick to heat transfer surfaces and downstream chutes and screens and cause plug ups that stop production and permit circulating scrubbing liquor and other oil and condensed tar to unexpectedly drain back into the reactor. The build-up of internally generated or externally recycled heavy tar condensate that sticks to heat transfer surfaces cokes and then impedes heat transfer because of build-up of less conductive surfaces.

Additionally, replacement of the packing by spray showers in the open tower may fail to remove enough carbon dust to prevent plugging downstream condensers. Therefore, liquid would still back up into the reactor after downstream plugging.

Also, if the tower is removed and an aspirating venturi scrubber installed for direct contact scrubbing, operation may still be erratic. Partially condensed heavy tar may entrap fiberglass fiber and carbon dust and plug up the venturi allowing circulating liquids to again back up into the reactor, and the carbon may also plug liquid system lines, such as pump suction lines. Batch and continuous centrifuges in conjunction with the venturi may also have difficulty removing the carbon black evolved from the reactor of embodiment 1. Additionally, some of the highest quality, smallest particle carbon black dust is recovered in the dust scrubbing system and dust losses from the reactor can be high.

The reactor 32 of the first embodiment is additionally subject to heat transfer difficulties because of severe feed shrinkage. The feed shrinkage is due to volatilization of a portion of the feed and changes in bulk density from feed to product char of twenty to twenty-one pounds per cubic foot to thirty-seven to thirty-nine pounds per cubic foot. The shrinkage causes uncovering of some of the heat transfer surface of the reactor 32. The installation of a dam at or near the discharge of reactor 32 does raise the level of solids and immerses more heat transfer area but does not cause all of this uncovered heat transfer surface of the reactor 32 to become covered.

The problems associated with the first embodiment may be avoided by initially removing the dust from the product oil condensed at high temperatures as discussed in the second and third embodiments.

SECOND EMBODIMENT VAPOR TREATMENT

In the second embodiment, the vapor phase rises through a vapor disengaging space, vent, or hood in the reactor 32' to a direct contact scrubber system 38' which also acts as a direct contact condenser. The hood slows the velocity of the vapor phase in the reactor and permits some of the dust entrained in the vapor to remain in the reactor 32'.

The direct contact scrubber system 38' comprises a two-stage venturi system 400 including first stage venturi 402, second stage venturi 404, a clarifier system 405 and a centrifuge system 407. Vapors from the reactor 32' pass along insulated path 40' which should preferably be as short as possible to venturi system 400 and more particularly to the gas inlet 401 of first venturi 402. Each venturi 402, 404 has a vapor/liquid discharge separator 406, 408 respectively. The liquid outlets 410, 412 respectively of separators 406, 408 are connected to the inlet of pumps 414, 416 respectively. The separators 406, 408 also serve as surge vessels for pumps 414, 416 respectively. The discharge of pumps 414, 416 are connected to coolers 418, 420 respectively. Coolers 418, 420 may be of any indirect heat exchange variety, such as, preferably, water cooled. The outlet 422 of cooler 418 has flow path 424 to the wash fluid inlet 426 of venturi 402 and a flow path 428 to the inlet path 430 of clarifier 432 of clarifier system 405. The outlet 434 of cooler 420 has flow path 436 to the wash fluid inlet 438 of venturi 404 and a flow path 440 to the storage system (not shown) for light fuel oil effluent from the plant.

The vapor outlet 442 of separator 406 is connected by path 444 to the vapor inlet 446 of second venturi 404. This permits the non-condensed vapors to pass in series through the two scrubber/condensers. The outlet 448 of separator 408 is connected by path 450 to knock-out drum/separator 452 of the vapor recovery system discussed infra.

Clarifier system 405 includes clarifier 432 divided by dam 433, residuals pump 454, and make-up pump 456. The suction side of residuals pump 454 is connected to the clarifier 432 on the upstream side of the dam 433 by path 458. The discharge side of residuals pump 454 is connected to the centrifuge 460 of centrifuge system 407 by path 461. The suction side of make-up pump 456 is connected to the clarifier 432 on the downstream side of the dam 433 by path 462. The discharge side of make-up pump 456, is connected to the separator 406 by path 464. The discharge side of make-up pump 456 is also connected to the storage (not shown) of heavy fuel oil by path 48.

Centrifuge system 407 includes continuous centrifuge 460 and sludge pump 466. The cake outlet of centrifuge 460 is connected by path 465 to the inlet of sludge pump 466. The liquid discharge outlet 469 is connected by path 470 to path 430 leading to clarifier 432. The outlet of sludge pump 466 is connected to the inlet of reactor 32'. A typical pump for recycling sludge recovered by centrifuging is an open throat progressing cavity pump such as a Moyno open throat pump described in Bulletin 120-D of Robbins & Meyers.

In the second embodiment, vapors from the reactor 32' pass by path 40' through the two-stage venturi system 400 to remove vapor borne dust particles and for direct contact condensation at two temperature levels. Each venturi 402, 404 thoroughly mixes the vapors with cooled oil from separators 406, 408, respectively, and discharges the mixture into separators 406, 408 respectively. The gas/oil mixture separates in separators 406, 408. The separators 406, 408 also serve as surge vessels for pumps 414, 416 respectively. Pumps 414, 416 pump the oil from separators 406, 408 respectively, through coolers 418, 420, respectively, to take out the heat necessary for the oil to cool and condense the vapor entering the venturis 402, 404, respectively.

The non-condensed vapors pass in series through the two scrubber/condensers 402, 404 along paths 40', 444 and 450 to knock-out drum/separator 452 which is part of the vapor recovery system described infra.

The temperature of the vapors from the first separator 406 are, preferably, controlled to maintain flash point on the heavy fuel oil produced at path 48. The temperature of the non-condensed vapors from the second venturi 404 is reduced by cooler 420 to permit minimum power requirements for the vacuum pump used in separation of gas and condensate in the vapor recovery system discussed infra. The vapors are mixed in the venturis with condensate recovered from the separators, and, for separator 406, heavy fuel oil from path 464.

A portion of the oil from separator 406 is bled off by paths 428 and 430 to clarifier 432. The bleed stream contains recovered dust and condensed oil, such as three percent char by weight. The quantity of oil transported in the bleed stream is greater than the make-up oil introduced by path 464. A thickened oil, containing a heavier proportion of solids to oil than is introduced into the clarifier 432 is pumped by pump 454 from the upstream side of dam 433 of clarifier 432 to continuous centrifuge 460. The centrifuge subjects the stream to a force of over two thousand times gravity and, preferably, over three thousand times gravity and thereby separates the stream into a cleaner, heavy oil stream and a heavy thixotropic sludge or cake, approximately twenty-five to thirty-five percent carbon black solid by weight. The cake is recycled to the reactor 32' along path 468 by the open throat progressing cavity pump 466. This heavy slurry may also be thinned, if desired, by recycling a portion of the condensed, light oil to the pump 466 or the clarifier 432, such as by path 470.

The liquid discharge from the centrifuge 460 contains less weight percent of dust or char than the feed to centrifuge 460 and considerably less dust or char than the cake produced by the centrifuge 460. This liquid discharge is returned to the clarifier 432.

The clarified liquor resulting from overflow over dam 433 contains less solids than either the centrifugate or the bleed stream from first venturi separator 406. This clarified liquor is pumped by pump 456 from the downstream side of dam 433 along path 48 to heavy fuel oil storage (not shown) and along path 461 to first venturi separator 406 to maintain level in first venturi separator 406.

Net light fuel oil make from the second venturi separator 408 is also bled off by path 440 from the recycle, cooled scrubbing liquor line to storage. It is not believed necessary to add an additional clarifier for this stream since the purpose of the second venturi scrubber 404 is used primarily for direct contact cooling. However, another clarifier could be added without departing from the spirit of the invention.

THIRD EMBODIMENT VAPOR TREATMENT

In the third embodiment, the vapor phase rises through a hood in the reactor 32' to a direct contact scrubber system 38" which also acts as a direct contact condenser. As in the second embodiment, the hood slows the velocity of the vapor phase in the reactor 32' and permits some of the dust entrained in the vapor to remain in the reactor 32'.

The direct contact scrubber system 38" comprises a scrubbing tower 500, a clarifier system 502, a centrifuge system 504 and a cooler 505. Vapors from the reactor 32' pass along path 40' which should preferably be as short as possible to scrubbing tower 500 and more particularly to the top of the tower. The scrubbing tower 500 includes a substantially cylindrical body 506 with a gas flow inlet 508 at the top and an open bottom 510. Scrubbing tower 500 further includes a cobbled side outlet 512. Open bottom 510 and cobbled side outlet 512 are both surrounded by the body of clarifier 514 of clarifier system 502. Body 506 extends beyond the body of clarifier 514 through opening 516 in clarifier 514. Scrubbing tower 500 additionally includes vapor outlet 518 and scrubbing liquid inlets, such as 520, 522, 524 and 526 which terminate in scrubbing tower 500 with scrubber sprays 528, 530, 532 and 534 respectively. The number of inlets and outlets in scrubbing tower 500 set out are illustrative, and no limitation is intended thereby. The scrubber sprays 528, 530, 532 and 534 are, preferably, hollow cone sprays that can spray either upward or downward in the vertical scrubbing tower 500.

The vapor outlet 518 of scrubbing tower 500 is connected by path 536 to the vapor inlet of cooler 505. The outlet of cooler 505 is connected by path 538 to knock-out drum/separator 540 of the vapor recovery system discussed infra.

Clarifier system 502 includes clarifier 514, residuals pump 542, accumulator 544, make-up pump 546 and cooler 548. Clarifier 514 is mounted at an inclined angle with respect to the horizontal with scrubbing tower 500 being inserted into the clarifier 514 at a position close to the highest portion of clarifier 514 with respect to the horizontal. The suction side of residuals pump 542 is connected to the clarifier 502 at a position close to the lowest portion of clarifier 514 with respect to the horizontal by path 550. The discharge side of residuals pump 542 is connected to the centrifuge 552 of centrifuge system 504 by path 583. The clarifier further includes overflow connection 554. Overflow connection 554 is connected to the inlet of accumulator 544 by path 556. Accumulator 544 includes gas outlet connection 558 which is connected to clarifier 514 by path 560. The suction side of make-up pump 546 is connected to the bottom of accumulator 544 by path 562. The discharge side of make-up pump 546 is connected to the upstream side of cooler 548 by path 564. The downstream side of cooler 548 is connected to the liquid inlets, such as 520, 522, 524 and 526 by path 566. The downstream side of cooler 548 is also connected to the storage (not shown) of heavy fuel oil by path 48.

Centrifuge system 504 includes continuous centrifuge 552 and sludge pump 568. The cake outlet of centrifuge 504 is connected by path 570 to the inlet of sludge pump 568. The liquid discharge outlet 572 is connected by path 574 to path 576 leading to clarifier 502. The outlet of sludge pump 568 is connected to the inlet of reactor 32'. A typical pump for recycling sludge recovered by centrifuging is an open throat progressing cavity pump such as a Moyno open throat pump described in Bulletin 120-D of Robbins & Myers. A sample or overflow path 578 branching from path 570 may also be provided.

In the third embodiment, vapors from the reactor 32' pass by path 40' to the top of scrubbing tower 500 to remove vapor borne dust particles and for direct contact condensation. Cooling and condensing sprays 528, 530, 532, 534 fed by cooled heavy oil from pump 546 and cooler 548 along path 566 reduce vapor temperatures to, for example, 350° F. or below for flush point control of the heavy fuel oil product. Liquids fall through scrubbing tower 500 and are discharged through the bottom 510 and cobbled side 512 which are located below the level of the sludge blanket in clarifier 514. Uncondensed vapor sleave the bottom exterior section of body 506 at vapor exit 518 which is located above the top of clarifier 514 and pass through the secondary indirect, for example, water cooled, heat exchanger 505 to separator 540 discussed infra.

Clarified heavy fuel oil from the clarifier 514 overflows along path 556 to accumulator 544 which also acts as a surge vessel for pump 546. Any vapors entrained with the overflow liquid are returned to the clarifier 514 by path 560 and eventually devolve through clarifier 514 and a portion of scrubbing tower 500 to vapor exit 518. The hot, heavy fuel oil in accumulator 544 is pumped by pump 546 through the indirect, for example, water cooled heat exchanger 548 both to product storage by path 48 and to the scrubbing tower 500 by path 566.

Sludge or sediment from the clarifier 514 is pumped by pump 542 to continuous centrifuge 552. The centrifuge subjects the stream to a force of over two thousand times gravity and, preferably, over three thousand times gravity and thereby separates the stream into a cleaner, heavy oil stream and a heavy thixotropic sludge or cake, approximately twenty-five to thirty-five percent carbon black solids by weight. The cake is recycled to the reactor 32′ along path 570 by the open throat progressing cavity pump 568. This heavy slurry may also be thinned, if desired, by recycling a portion of the condensed, light oil produced by the vapor recovery system discussed infra to the pump 568 or the clarifier 514, such as by path 80″.

The liquid discharge from the centrifuge 552 contains less weight percent of dust or char than the feed to centrifuge 552 and considerably less dust or char than the cake produced by the centrifuge 552. This liquid discharge is returned to the clarifier 514 by path 574.

As examples of alternatives, clarifier 514 may be level rather than slanted and accumulator 544 may be eliminated and replaced by an enlargement in path 566 to act as a reservoir for pump 546. Additionally, embodiment three is a slight improvement over embodiment two in that excessive carryover of fiberglass that can plug up the mixing heads of venturi 402 by sticking to condensed heavy tars will not plug up scrubbing tower 500. Therefore, a direct contact venturi scrubber/condenser could be used instead of the indirect cooler 505 and separator 540 because all fiberglass will be removed in scrubbing tower 500.

SECOND AND THIRD EMBODIMENTS CHAR FEEDBACK AND DAMMING

Damming

A dam may be installed on the discharge end of reactor 32′ to raise the level of solids in the reactor and immerse more heat transfer surface. In addition, an outside, overflow weir 51′ may be installed at the inlet to conveyor 51 to raise the level in the reactor 32′.

Char Feedback

The pyrolyzed carbonaceous solid phase effluent or char from the reaction vessel 32′ is elevated by inclined screw conveyor 51 to a splitter 53. Splitter 53 divides the char into a first portion 55 of recycle char and a second portion 88 of net product char. Splitter 53 is capable of adjustment of the split between net product char and recycle char from 100% to 0%. The first stream 55 is connected to path 35 at the inlet of reactor 32′. The second stream 88 is connected to the inlet 90 of cooler 92 as discussed infra. Preferably, a portion between ten and eighty percent, and more preferably forty percent, of the hot char or carbonaceous solid phase effluent from reactor 32′ is recycled to reactor 32′. The char could be introduced into the reactor 32′ at any point or points along, preferably, the first half of the length of the reaction vessel. As an alternate, the char could be cooled by cooler 92 prior to recycling 32′, but this would be more thermally inefficient.

The recycled part of the product char from stream or path 55 absorbs internally generated, condensed heavy tar in reactor 32′ and recycled sludge from the centrifuge system 504. The condensation is caused by roof heat losses. The absorption prevents caking and coking of the heat transfer surfaces. The recycled char also tends to partially fill up the reactor 32′ with non-shrinking solids so more heat transfer surface can be covered at all times.

ALL EMBODIMENTS

Experimental work has indicated that a reaction time of 3 to 90 minutes is required to achieve optimum pyrolysis. This optimum reaction time is a function of the feed rate, retention time, temperature of the reactor, the partial pressure of the gas over the pyrolyzing fragments, the rate at which the vapor phase is removed from the pyrolysis reaction vessel, the size of feed chips, and the amount of liquid process condensate present with the solid phase in the reactor.

The embodiments of the present invention utilize stainless steel construction because of the high temperatures involved in the reaction. After experimentation and study, it has been determined that a retention time in the reactor of between 5 and 10 minutes is optimum. Substantially complete pyrolysis ca be achieved during this reaction time by utilizing tire fragments less than 1-½ inches in size, a reactor temperature of approximately 800°–900° Fahrenheit resulting from heat exchange with molten salt of approximately 1050° Fahrenheit at a pressure of 6–22 PSIA. Preferably the pressure would only be about five to six inches of water below atmospheric pressure to reduce the demand on the reactor seals and reduce dust in the vapors. This combination of pyrolysis reactor conditions has proved optimum and practical.

It is possible to obtain practically the same result as is taught by the optimum example given in connection with these embodiments of the present invention by reducing reaction temperature and reducing reaction pressure; or by reducing reaction temperature and increasing resident time; or by reducing reaction temperature and grinding and screening feed chips smaller; or by increasing reaction temperature and pressure; or by increasing residence time and operating at atmospheric or slightly higher pressures. Thus it is clear that the optimum conditions given with the embodiments of the present invention are optimum for a particular commercial application and should not be interpreted to limit the present invention.

Similar results can be obtained by those skilled in the art by careful choice of reaction conditions. The reactor temperature can be varied from 750° to 1800° Fahrenheit, reaction time can be from 90 to 3 minutes, partial pressure of the gas over the reaction can vary from 1 to 22 PSIA, the feed chip size can vary to any size equal to or below three inches.

It is important to guard against air leaking into the system while it is operated at subatmospheric pressure because air will burn the oil and gas vapors, cause fires, will oxidize the surface of the partially pyrolyzed carbonaceous solid phase and changes the properties of the carbon black produced. In the embodiments of the present invention, air leakage is guarded against by the use of seals and a blanketing inert purge gas at a pressure slightly higher than atmospheric between the atmospheric and low pressure parts of the system, such as, for example, inert purge just before the rotary air locks at the entry and discharge parts of the reactor 32 or 32', and efficient air locks at both ends of the reactor/condenser system, and sealed screw conveyors operating within the pyrolysis reactor vessel/condenser system. An inert gas blanket can be used for start-up of reactor 32 or 32'.

An alternative embodiment would include placing an air lock between the reactor 32 or 32' and char cooler, reducing air leakage through the char cooler 92. This air lock would eliminate an expensive and maintenance prone seal on the discharge end of the char cooler 92. In the alternate embodiment, an inert purge gas such as a small portion of product fuel gas may be introduced between the reactor discharge air lock and the reactor or through the side of the air lock.

III. Vapor Recovery System p In embodiment 2, as discussed supra, the outlet of second separator 408 is in fluid communication with oil separator 452 through path 450. The lower portion 453 of oil separator 452 is in fluid communication by path 75 with recycle path 470.

In embodiment 3, as discussed supra, the outlet 518 of tower 500 is in fluid communication with oil condenser 505 through path 536. The cold end of condenser 505 is in fluid communication with oil separator 540 through path 538. The lower portion 541 of oil separator 540 is in fluid communication with oil product line 86 by path 543 and pump 545.

Oil separators or knock-out drums 452 or 540 in embodiments 2 and 3 respectively are also in fluid communication by path 62 with the low pressure side of wet vacuum pump 64. The high pressure side 66 of vacuum pump 64 is in fluid communication with separator or knock-out drum 68. Fuel gas line 70 is in fluid communication with upper portion 72 of separator or knock-out drum 68. For a wet type vacuum pump 64, the lower section 74 of separator 68 is in fluid communication with the hot side 76 of seal water cooler 78 through line 80. The cold side 82 of seal water cooler 78 is in fluid communication with vapors from path 62 and is used both as a seal and for removal of heat of compression.

The vacuum pump 64 is a combination vacuum pump/gas compressor that can pull a vacuum on vapors between it and the reactor and discharge noncondensed by-product fuel gas from separator 68 at a pressure sufficiently above atmospheric pressure to allow the fuel gas to be burned for the fuel necessary to run part of the process. In embodiments 2 and 3, the lower section 74 of separator 68 may also be in fluid communication with recycle paths 470 and 80' respectively to clarifiers 432 and 514 respectively. Should recycle from paths 470 or 80' of embodiments 2 or 3 respectively be unnecessary, the oil from these paths may be discharged to product line 440, 86 respectively.

Light fuel oil for a wet vacuum pump seal is preferred over the use of water. If water is used, a strainer should be placed in the suction to prevent erosion from well water sand. In addition to the above potential maintenance problem, the use of water may cause serious galvanic corrosion of steel internally on wet vacuum pumps from fine carbon black carryover in the seal water. On start up, the vacuum pump casing should be filled with a light fuel oil, such as naptha. During operation there will be a net production of light oil from compressing and cooling of the fuel gas and no further oil addition is usually required.

Vacuum pump 64 is shown in the embodiments as a wet type pump, but it may also be a dry type pump. In a dry system, the rise in temperature of the fuel gas caused by the heat of compression is not detrimental if the non-condensed vapos are used for fuel gas in the plant. If they are to be used for petrochemical feed stock recovery, they should be cooled by an aftercooler on the discharge side of the vacuum pump.

Care should be taken that the vacuum pump does not produce more vacuum than the reactor seals can hold when clean. Air leakages may result, causing fires.

In embodiment 1, wet vacuum pump 64 is a water sealed pump. The heat of compression is absorbed by the water, which is then separated in separator 68 and recycled through line 80 and seal water cooler 78 into the input side of pump 64. However, a water sealed pump may create several problems. A water sealed pump usually is supplied with a very small separator. Such a separator is inadequate for oil, water, fuel gas vapor separation. The process of the present invention condenses some light hydrocarbon vapor upon compression from a vacuum to six to eight p.s.i.g. pressure with internal cooling in the wet vacuum pump and seal water cooler. For water sealed pumps, circulating closed circuit cooling water, the hydrocarbon condensed is emulsified with the water. This emulsion would ultimately have to be broken or discharged into a waste disposal pond. Additionally, problems also occur with the fuel gas from slugs of water and liquid hydrocarbon. These problems are overcome in embodiments 2 and 3 by the use of an oil seal and an adequate gas/oil separator on the discharge of pump 64. These problems may also be overcome by use of a dry vacuum pump and an adequate gas/oil separator on the discharge of the dry vacuum pump.

In embodiment 2, the venturi system pulls the required vacuum in the reactor 32'. Therefore, in embodiment 2, vacuum pump 64 could be replaced by a compressor adequate for raising the pressure of the fuel gas and recycle liquids for storage and use in the process.

OPERATION OF VAPOR RECOVERY SYSTEM OF EMBODIMENT 2

Functionally for embodiment 2, vacuum pump 64 may maintain a subatmospheric pressure in reaction vessel 32' and venturi separators 406, 408 and the lines connecting them with each other and the vacuum pump 64 and raise the pressure of the fuel gas and recycle liquids for storage and use in the process.

In embodiment 2 of the present invention, vapors are evacuated from the pyrolysis reaction vessel 32' by vacuum pump 64. These vapors are routed through one or more venturis, e.g., venturis 402, 404 and one or more oil/gas separators, e.g., separators 406, 408, 452 between the reactor 32' and the vacuum pump 64. The vapor phase of the pyrolysis reaction is condensed in venturi condensers 402, 404. The oil is then separated from residual fuel gas by oil separators 406, 408, 452. The residual fuel gas is drawn through vacuum pump 64 and is separated from the oil used for sealing by separator 68. The fuel gas then flows out through line 70 and can be used to provide process heat. Functionally for embodiment 2, vacuum pump 64 maintains a subatmospheric pressure in reaction vessel 32' and venturi separators 406, 408 and the lines connecting them with each other and the vacuum pump 64.

OPERATION OF VAPOR RECOVERY SYSTEM OF EMBODIMENT 3

Functionally for embodiment 3, vacuum pump 64 maintains a subatmospheric pressure in reaction vessel 32' and tower 500 and cooler 505 and separator 540 and the lines connecting them with each other and the vacuum pump 64.

In embodiment 3 of the present invention, vapors are evacuated from the pyrolysis reaction vessel 32' by vacuum pump 64. These vapors are routed through tower 500 and one or more condensers, e.g., condenser 505, and one or more oil/gas separators, e.g., separator 540 between the reactor 32' and the vacuum pump 64. The vapor phase of the pyrolysis reaction is partially condensed in tower 500 and condenser 505. The oil is then additionally separated from residual fuel gas by oil separator 540. The residual fuel gas is drawn through vacuum pump 64 and is separated from the oil used for sealing and any additional equilibrium condensation by separator 68. The fuel gas then flows out through line 70 and can be used to provide process heat.

The chemical composition of the by-product fuel gas after maximum oil recovery is shown in Table I below.

TABLE I

TIRE PYROLYSIS FUEL GAS

|  | Weight Percent | Mole Percent |
|---|---|---|
| Oxygen | 0.19 | .23 |
| Nitrogen | 3.87 | 5.20 |
| Carbon Monoxide | 5.92 | 7.95 |
| Methane | 8.44 | 19.88 |
| Carbon Dioxide | 5.58 | 4.78 |
| Ethane | 8.09 | 10.17 |
| Ethylene | 8.78 | 11.83 |
| Propane | 4.32 | 3.69 |
| Propylene | 7.90 | 7.08 |
| Isobutane | 1.41 | .90 |
| n-Butane | 1.32 | .87 |
| Butenes | 23.94 | 16.12 |
| Isopentane | 0.91 | .49 |
| n-Pentane | 0.76 | .38 |
| Butadiene | 3.78 | 2.64 |
| Methylbutadiene | 1.73 | .94 |
| 1, 2-Dimethylcyclopropane | 3.04 | 1.62 |
| Pentadiene | 3.77 | 2.07 |
| Hexane | 0.32 | .15 |
| 2-Methyl-1, 3-butadiene | 3.88 | 2.15 |
| Cyclohexane | 0.35 | .15 |
| Heptane | 0.19 | .08 |
| Benzene | 0.97 | .45 |
| Toluene | 0.30 | .11 |
| Xylene | 0.25 | .07 |
| Unaccounted for | · 0.98 | |
|  | 100.00 | 100.00 |
| Hydrogen Sulfide | 136 ppm by volume | |

The by-product oil condensed and separated in separators 58, 452 and 540 of embodiments 1, 2 and 3 respectively has a lower boiling point and is lighter than the heavier, higher boiling point condensate fraction of product line 48. This oil by-product is highly unsaturated and aromatic and has a high vapor pressure and low flash point. If used for fuel oil, a stabilization column is recommended to remove light ends.

It is also possible to add or blend cool heavy condensate from line 48 to the by-product oil. This oil could also be fractinated by multistage condensation in place of separation by separators 58, 452 or 540 to produce a plurality of hydrocarbon fractions. An analysis of the pyrolysis oil from rubber tires of the combined streams 86, 48 of embodiments 1 and 2 or streams 440, 48 of embodiment 3 and a distillation profile for the oil is given below as Table II.

TABLE II

PYROLYSIS OIL FROM RUBBER TIRES

| Molecular Weight | | 210.0 |
|---|---|---|
| UOP "K" Factor (calc) | | 10.6 |
| Water by Distillation | | 0.75% |
| Total Sulfur | | 0.774 Wt. % |
| Total Chlorides | | 0.0095 Wt. % |
| Density at 60° F. | | 0.9447 |
| Density at 150° F. | | 0.9384 |
| Viscosity at 60° F. | 12.06 cs | 66.29 SSU |
| Viscosity at 150° F. | 2.79 cs | 35.42 SSU |
| Reid Vapor Pressure | | 1.60 |
| Pour Point | | −15° F. |
| Flash Point (Tag Closed Cup) | | −30° F. |
| Ash Content | | 0.0399 Wt. % |
| Metals (By Emission Spec.) | | Below |
| Heating Value (BTU/lb.) | | 18,938 BTU/lb. |
| True-Boiling-Point Distillation | | Below |

| DISTILLATION PROFILE | | |
|---|---|---|
| Fraction % of Charge | Percent Distilled | Temperature °F. |
| 9.99 | 9.99 | 137 |
| 5.03 | 15.02 | 233 |
| 5.09 | 20.11 | 277 |
| 5.03 | 25.14 | 324 |
| 5.09 | 30.23 | 412 |
| 5.09 | 35.32 | 468 |
| 5.09 | 40.41 | 520 |
| 7.18 | 47.59 | 585 |
| 5.55 | 53.14 | 630 |
| 5.09 | 58.23 | 688 |
| 5.35 | 63.58 | 710 |
| 5.09 | 68.67 | 744 |
| 5.09 | 73.76 | 795 |
| 5.09 | 78.85 | 821 |
| 5.03 | 83.88 | 853 |
| 5.35 | 89.23 | 885 |
| 10.77 | 100.00 | Residue |

| Component | Vol % |
|---|---|
| Alkyl Benzenes | 23 |
| Penylnapthalenes | 2 |
| Phenols | 8 |
| 3-Ring Aromatics | 5 |
| Acenaphthylenes | 4 |
| Biphenyls | 5 |
| Alkylnaphthalenes | 9 |
| Indenes | 8 |
| Alkylstyrenes | 8 |
| 4-5-6 Ring Aromatics and Heterocyclic | 20 |

It has also been experimentally found that care must be taken to control the oil condensation temperature in exchanger 52 of embodiment 1 to prevent the formation of a stable colloidal emulsion of oil and water, the water being the continuous phase and the oil being the dispersed phase.

IV. Solids Cleaning Section

The output path 88 of pyrolysis reaction vessels 32, 32' is in fluid communication with the input end 90 of solid phase heat exchanger 92. The solid phase exiting reaction vessel 32 of embodiment 1 and the nonrecycled solid phase exiting reaction vessel 32' of embodiments 2 and 3, enters indirect heat exchanger 92, which lowers its temperature from approximately 850° F. to less than 300° F. Heat exchanger 92 is preferably a water jacketed hollow shaft, hollow flight unit. Reducing the temperature of the pyrolyzed solid phase lessens the possibility of spontaneous combustion in subsequent milling and storage operations and greatly reduces contamination of the product carbon black. By maintaining exit temperature above the boiling point of water, atmospheric pressure adsorption of water from the atmosphere is substantially reduced with simultaneous reduction in operating trouble of downstream conveyors, screens and the roller mill.

From the output of exchanger 92, the solid phase carbonaceous material moves through magnetic separator 94. At this point the residual steel wire remaining in the material is essentially free of rubber and can be easily removed with a magnet. The rayon, cotton, polyester and nylon cording and fabric have been destroyed by heat. Residual fiberglass is no longer bonded to the rubber and appears as a fluffy mass with some pyrolyzed solid phase carbonaceous material.

After the magnetic separator removes the last trace of steel wire, the solid mass is conveyed (conveyor is not illustrated) to a double deck enclosed vibrating screen 96. The top deck, comprising a 4 to 10 mesh, and preferably a 6 mesh screen, scalps most of the matted fiberglass and larger particles of pyrolyzed rubber and discharges them to a trash bin via trash stream 98. The second deck comprises a 30 to 60 mesh, and preferably a 40 mesh, screen. Material retained on this screen is recycled back to the pyrolysis reaction vessel 32 or 32' via recycle line 100. This recycle stream contains pyrolyzed rubber and unremoved fiberglass. In the embodiments of the present invention, the coarse screen is 6 mesh, and the fine screen is 40 mesh. The char remnant of the pyrolyzed solid phase carbonaceous material exits double screen 96 by line 102 and proceeds to the char milling and recovery section.

V. Char Milling and Recovery Section

The inlet feed from line 102 to the char milling and recovery section includes an aggregation of very small particles of carbon black cemented together in a skeletal matrix of residues from the decomposition of the tire rubber.

The carbon black results from the carbon black portion of the tire. The carbonaceous material formed in the destructive heat treatment of the rubber and heavy oils in the tires acts as the binder for the individual carbon black particles in the skeletal matrix of the char. The milling process of the present invention consists of breaking down the char agglomerates into individual carbon black particles as well as into much smaller agglomerates of carbon black particles, the agglomerates being less than 40 microns in diameter. Because different grades are used in the tread and walls of the tire and because different tire producers use different quantities of different carbon blacks, the carbon black recovered by the present invention from the original tire composition is a mixture of commercial carbon blacks from many sources in varying proportions. Therefore, carbon black produced by the present invention is a mixture of commercial carbon blacks and new carbon black and has mixed carbon black properties.

The char inlet feed from the double deck screen 96 passes by conveyor 102 to roller mill 104. Roller mill 104 is air swept with a stream of air from blower 106. The rollers in the roller mill break down the large agglomerates into individual carbon black particles and small agglomerates. These particles are then picked up by the flow of air through the mill 104 and carried to mechanical separator 108. Mechanical separator 108 functions centrifugally to remove larger particles from the air stream. A portion of the heavy rejects from the mechanical separator and the roller mill, which comprise a stream of less than 5% of the total mill feed, leave the process as trash through line 110. Output stream 110 essentially eliminates all residual fiberglass, iron rust and heavy metallic ash. The remaining carbon black is conveyed by air stream 112 to cyclone separator 114. Eighty to ninety percent of the carbon black is separated here from the air stream and conveyed to pelletizer 120. The remaining carbon black travels with the air stream back through air return 116 to the suction of blower 106 where it is compressed and recycled. Additionally, make-up air is also introduced to the section of the blower 106 through line 117. The major part of the discharge of the blower 106 flows directly to mill 104 to sweep up dust particles. A sidestream is bled off to pass through line 119 and, under pressure, through bag filter 118 where the remaining carbon black is trapped and fed to pelletizer 120. The air from bag filter 118 is vented to atmosphere through line 121 and a blower (not shown).

Those skilled in the art will recognize that carbon black can be produced from char by other types of mills. There are also competitive means on the market for removing heavy impurities, though not as efficiently or with as little loss of carbon black as is possible using the present invention. The prior art teaches the use of impact hammer mills for grinding char. Hammer mills, for example. can be fitted with mechanical separators.

Of course, the finer the char is milled, the better carbon black properties can be obtained. The embodiments of the present invention use an air swept roller mill with mechanical separators. This does a far superior job of grinding the char to a finer size using much less energy than the prior art.

In the embodiments of the present invention, it has been determined that a roller mill used in combination with mechanical separators and a cyclone and dust bag separator yields a process that can reject larger and heavier particles of residual ash and iron rust from the system without too much loss of valuable carbon black. This system will also reject a major portion of the residual fiberglass left in the char. The present invention is the first use of roller mills to produce high quality carbon black from the char formed by pyrolysis of used tires. It has been experimentally determined that the present invention, i.e. an air swept roller mill with mechanical separators, can produce 99.9% by weight carbon black product passing a 325 mesh screen (44 micron maximum particle diameter) and a reject stream of less than 5% of total mill feed that will essentially eliminate residual fiberglass, iron rust and heavy metallic ash.

It should be noticed that the embodiments of the present invention recover two products. First, the cyclone separator fines and secondly the bag dust collector fines. These can be mixed together as a common product or kept separate as two grades of carbon black. Since the bag filter fines have been elutriated from the other fines they will consequentially be of smaller average particles size, have lower bulk density and higher specific surface. This will give them different physical properties from the cyclone separator fines.

At this point in the process, the carbon black must be pelletized to form a denser, more dust free pellet.

VI. Pelletizing and Pellet Drying Section

Carbon black passes from bag filter 118 and cyclone separator 114 to pelletizer 120, which is a commercially available pelletizer. Here the pellets are wetted with water delivered to hot water inlet 122. This water may in part be the water that was heated by indirect heat exchange with other process flows. By "process flows" it is meant the heavy condensate product stream, oil products stream, and partially pyrolyzed solid phase carbonaceous material stream that were cooled with indirect heat exchange with cold water.

Most commercial carbon black is pelletized with water and with suitable binders. While users want denser and more dust free pellets, they still want to retain the dispersion properties of unpelletized blacks.

The embodiments of the present invention use hot water (140°–180° F. and preferably at 165°–170° F.) without a binder for pelletizing carbon black. Use of a binder is, however, known in the art and such binder may also be utilized in the present invention. Carbon black has high surface area per unit weight and this surface must be completely wetted before stable pellets can be produced. The embodiments of the present invention use 39.5 pounds of 170° Fahrenheit water per 60.5 pounds carbon black dust to produce a suitable feed for wet pelletizing equipment. This water must then be driven off by heat in pellet dryers before the dry pellet (less than 1% moisture) is bagged and shipped. Extreme care must be taken not to degrade the pellet back to fines on drying. For ready dispersion after drying, it is also necessary that a soft pellet be produced from the pelletizer. Excessive attrition must also be prevented in drying. In addition, the interstitial moisture must be uniformly and slowly removed to prevent disintegration from excessive early steam generation.

The present invention uses commercially available pelletizing equipment. The embodiments of the present invention could utilize commercially available carbon black pellet dryers. Because of the very high surface area of carbon black pellets and the affinity of this surface for water, temperatures much higher than the atmospheric boiling point of water must be used to insure that the pellets have discharged moisture down to the minimum residual moisture of less than 1% by weight in the product pellets.

EMBODIMENTS 2 and 3 DRYERS

In the second and third embodiments, the wet pellets are conveyed to a commercially available indirect pellet dryer, such as a rotary drum. The indirect rotary dryer burns fuel outside the shell of the dryer and transfers the heat through the walls to the drying solids inside the shell which is usually rotating. Because of the very high surface area of carbon black pellets and the affinity of this surface for water, temperatures much higher than the atmospheric boiling point of water must be used to insure that the pellets have discharged moisture down to the minimum residual moisture of less than 1% by weight in the product pellets. The dry pellets exit the dryer at about 300° F. and 0.45% moisture by weight.

The moisture laden flue gases from both drying sections of embodiment 1 and from the indirect dryer of embodiments 2 and 3 are mixed in duct 134 and enter dust collector 136 of embodiment 1 or 136' of embodiments 2 and 3 at, preferably, about 147° F. with a dew point of 119° F. For embodiment 1, a further spread of wet and dry temperatures is possible by bypassing part of the heated air from either stage around the dryers and mixing with exit gases ahead of the dust filter. The dust filter is conventional as is rehandling of the collected dust. The collected dust travels through conveyor 138 to the recycle stream 132 in embodiment 1 and travels through conveyor 138' to the pelletizer in embodiments 2 and 3. The filtered air is discharged through vent 140 to the atmosphere.

The pellets go from the dryer along conveyor 128 to a double deck screen 130. This screen has a top screen that separates oversized pelletizer formations from properly sized pellets and fines. The second screen is sized such that it retains the properly sized carbon black pellets but passes the fines. Both the oversized pellets and the fines are recycled by recycle stream 132 into the roller mill 104.

Properly sized and dried carbon black pellets are conveyed out of the process by output stream 142 for bagging or bulk shipment.

VII Example

The following is given as an example that illustrates, but should not limit, the present invention.

The pieces are fed into a hollow shaft, hollow flight screw conveyor pyrolysis reactor with reduced pitch flight. The hollow shaft, and hollow flights are heated with 1025° F. circulating molten salt pumped through a rotating inlet shaft seal and returned to a collection drain sump which allows gravity return of partially cooled molten salt at 950° F. to the salt heating system. The reactor feed is heated to 850° F. by indirect heat exchange with the molten salt for a retention time of 30 minutes in the reactor. Vapors from the reactor 32' pass through a two stage scrubbing/condensing train 38' which are irrigated with recycled cooled liquid from their separators. Temperature of the exit vapor from the No. 1 Scrubber/Condenser 402 is maintained at 320° F. by control of recycled scrubbing set at 300° F. Temperature of vapors leaving the No, 2 Scrubber/Condenser 404 are controlled at 105° F. by control of recycled scrubbing oil at 90° F. Product oil is bled off the two Scrubber/Condensers 402, 404 to storage after cooling from the recycle streams. A total of 2078 lbs./hr. of total oil is produced with 75% by volume of product oil being recovered as heavy fuel oil with a flash point of 150° F. and a specific gravity 0.96–0.98 and 25% by volume light naptha being recovered with a specific gravity of 0.80–0.84 and with a vapor pressure of 8 to 12 PSIA depending upon cut-off point with heavy fuel oil and the temperature of vacuum pump discharge separator vapor/liquid equilibrium. 193 lbs./hr. fuel gas and 5 lbs./hr. uncondensed steam pass from separator 452 to the suction of the vacuum pump 66. A wet vacuum pump is used wherein condensed naptha takes out the heat of compression. A temperature rise of 15° F. to 105° F. across the vacuum pump will occur which is removed by indirect water cooling in exchanges 78. The vacuum pump is designed for a suction pressure of 13.0 PSIA and a discharge pressure of 25.0 PSIA with the reactor operating at 6 inches of water vacuum on the vapor space.

The solid phase carbeoaceous material product from reactor 32' now comprises char fines, larger char particles, steel wire, fiberglass and ash. It is cooled and then conveyed to another magnetic separator 94 where 290 pounds per hour of steel wire is removed with traces of char fines coating the wire. The non-magnetic material passes to a double deck vibrating screen 96 containing a 10 mesh and a 40 mesh screen. The oversize from the 10 mesh screen contains 27 lbs./hr. fiberglass and 27 lbs./hr. of larger char particles. The middle cut from the 40 mesh screen contains 8 lbs./hr. of glass fiber and 327 lbs./hr. of char. The oversize is discarded, and the middle cut is recycled to the feed end of the reactor 32.

The fines that pass the 40 mesh screen contain 16 lbs./hr. fiberglass and 1842 lbs./hr. of char fines. The fines are fed to a roller mill 104 with mechanical air separator and heavy mill reject attachment. The heavy mill reject system rejects 14 lbs./hr. fiberglass and 111 lbs./hr. heavy char and ash. The carbon black product including recycle (99.9 weight % -324 mesh) totals 2006 lbs./hr. of which 2 lbs./hr. are unremoved fiberglass.

This material is mixed with 170° Fahrenheit hot softened water on the basis of 0.395 lb. hot water to 0.605lb. carbon black in a carbon black pelletizer 120 of conventional design.

The wet pellets are fed to a conventional drum fluid bed dryer 126 350° Fahrenheit air in the first stage and 400° Fahrenheit air in the second stage to 230° F. Wet pellets totaling 3343 lbs./hr. are dried to 0.6% moisture by weight.

These pellets contain some oversize and some fines produced from the pelletizing operation and from attrition in the reactor and conveying equipment. This crude dried pellet stream is screened on a double deck vibrating screen 130 with a 10 mesh and an 80 mesh screen. The minus 10/plus 80 mesh center cut from the screen (totaling 1724 lbs./hr. of product pellets) is conveyed to product pellet bagging (not shown). The oversize, fines and fines from the dryer bag house totaling 289 lbs./hr. are recycled back to the roller mill 104 feed by a conventional conveyor system.

VIII Carbon Black Properties

Table III shows comparative chemical properties of "Pyroblack 7007", the carbon black produced by the present invention and two other standard commercial carbon blacks readily available on the market that it closely resembles.

TABLE III
COMPARATIVE CHEMICAL PROPERTIES NEW PYROBLACK 7007 AND TYPICAL COMMERCIAL CARBON BLACKS

| PROPERTY | METHOD | N-990 MT | Pyroblack 7007 | N-774 SRF |
|---|---|---|---|---|
| DBP Absorption cc/100g | ASTM D2414 (mod.) | 31 | 76 | 75 |
| Iodine Number | ASTM D1510 | 9 | 62 | 30 |
| C-Tab Number | Phillips | 14 | 56 | 36 |
| % Ash | ASTM D1506 | 0.20 | 13.36* | 0.51 |
| % Heating Loss | ASTM D1509 | 0.01 | 0.40 | 0.45 |
| Toluene Discoloration, % | ASTM D1618 | 12.8 | 90.2 | 94.0 |
| pH | ASTM D1512 | 7.99 | 7.12 | 8.75 |
| % Sulfur | ASTM D1619(B) | 0.00 | 2.04 | 0.64 |

*Primarily Zinc Oxide, Titania SiO$_2$

Table IV compares Pyroblack 7007, the carbon black product produced by the present invention, with other commerical carbon blacks and filler when vulcanized with rubber.

TABLE IV
TEST RESULTS

| | Modulus 300% | Ultimate Tensile | Elongation |
|---|---|---|---|
| Nitrile Rubber | | | |
| SRF | 2240 | 2380 | 320 |
| Pyroblack | 1880 | 2350 | 360 |
| Neoprene | | | |
| SRF, MT | 2370 | 2500 | 320 |
| SRF, MT, Pyroblack | 2380 | 2380 | 300 |
| Butyl | | | |
| MT | 650 | 1240 | 530 |
| Pyroblack | 890 | 1630 | 510 |
| SBR | | | |
| SRF | 1840 | 2200 | 370 |
| Pyroblack | 1440 | 2050 | 410 |

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A process for manufacturing carbon black and hydrocarbons from discarded tires, comprising:
    cutting the tires into fragments;
    pyrolyzing the fragments in a pyrolysis reaction vessel at a temperature and pressure and for a reaction time sufficient to cause the fragments to dissociate into a vapor phase and a solid phase;
    recycling a portion of said solid phase back into the reactor;
    said pyrolyzing step including indirectly, internally heating the fragments in the reaction vessel with molten salt;
    producing carbon black from the solid phase; and
    processing said vapor phase to produce hydrocarbons.

2. A process as in claim 1 including:
    separating trash from the pyrolyzed solid phase after said reaction; and
    milling the pyrolyzed solid phase to carbon black.

3. A process as in claim 2 including:
    cooling the pyrolyzed solid phase after it leaves the pyrolysis reaction vessel.

4. A process as in claim 3 including:
    wetting at least a portion of the carbon black;
    forming the wetted carbon black into pellets; and
    drying the carbon black pellets.

5. A process as in claim 3 wherein the cooling is accomplished by passing said solid phase indirect heat exchange with water.

6. A process as in claim 5 wherein at least a portion of the water heated by indirect heat exchange with the solid phase is subsequently used to wet the carbon black.

7. A process as in claim 2 wherein milling of the pyrolyzed solid phase into carbon black is accomplished by passing the pyrolyzed solid phase through an air swept roller mill.

8. A process as in claim 3 wherein said tires contain steel reinforcing wire and said trash separation is a magnetic separation.

9. A process as in claim 1 wherein the heat is introduced through an internal, hollow shaft of the reactor having protrusions therefrom and the molten salt mixture is introduced into the rotating shaft through a rotating seal and returned from the shaft through means which are non-rotating.

10. A process as in claim 1 including initially passing the effluent vapor phase from the reactor vessel through a scrubber.

11. A process as in claim 10 wherein scrubbing of said vapor phase occurs in close proximity to the vapor outlet of the pyrolysis reaction vessel and at subatmospheric pressure.

12. A process as in claim 11 wherein a second portion of the vapor phase obtained by scrubbing a portion of the vapor phase is cooled to condense out oil and said oil is separated from the gas containing remainder of said vapor phase.

13. A process as in claim 12 wherein said oil is cooled out of the second portion of the vapor phase by passing the second portion of the vapor phase in indirect heat exchange.

14. A process as in claim 13 including:
compressing the gas containing remainder of the second portion of the vapor phase to provide fuel gas for the pyrolysis reactor.

15. A process as in claim 14 wherein said compression is accomplished by the same mechanical means used to maintain subatmospheric pressure in the pyrolysis reaction vessel.

16. A process as in claim 1 wherein a first portion of the vapor phase is scrubbed and partially condensed with a cooled condensate obtained by refluxing and cooling a second portion of the vapor phase obtained by scrubbing a portion of the vapor phase in a direct contact multi-stage scrubber.

17. A process as in claim 16 wherein the scrubbing occurs in low pressure drop, venturi type scrubbers with high volume reflux of the cooled condensate.

18. A process as in claim 16 wherein the scrubbing occurs in a direct spray condenser.

19. A process as in claim 17 wherein residue is obtained by the step of removing substantial quantities of liquids of a second portion of the cooled condensate by centrifuging a second portion of the cooled condensate, the residue being substantially in the form of a concentrated carbon black and the residue is recycled to the reactor.

20. A process as in claim 19 wherein the residue is recycled by a progressing cavity sludge pump back to the reactor.

21. A process as in claim 1 wherein the pyrolyzing occurs in an oxygen limited hydrocarbon vapor atmosphere isolated from ambient air by the use of an inert purge gas seal and airlocks at the entry port and discharge port of the reaction vessel.

22. A process for maufacturing carbon black and hydrocarbons from discarded tires, comprising:
cutting said tires into small pieces;
pyrolyzing the pieces in a pyrolysis reaction vessel at between 750° and 1800° Fahrenheit and oxygen limited hydrocarbon vapor atmosphere at between 1-22 PSIA for between 5 and 90 minutes to produce a substantialy pyrolyzed solid phase and a vapor phase;
recycling 10–80% of pyrolyzed material to the pyrolysis reaction vessel;
producing a condensate from a portion of said vapor phase in said reaction vessel, such portion containing the dust entrained in the vapors;
recycling the concentrated dust to the reactor;
fractionating a second portion of said vapor phase to produce oil and gas; and
recycling at least a first portion of the pyrolyzed solid phase into said reaction vessel.

23. A process as in claim 22 wherein pyrolysis occurs for between 5 and 25 minutes at about 850° Fahrenheit and about 14 PSIA.

24. A process as in claim 23 wherein the pyrolysis reaction vessel is a hollow shaft, hollow flight vessel and the fragments are moved through the vessel by at least one screw conveyor.

25. A process as in claim 24 wherein the screw conveyor has a reduced flight pitch.

26. A process as in claim 23 wherein the reaction vessel uses a hollow flight screw with square pitch flights.

27. A process as in claim 23 wherein the pyrolysis reaction vessel contains a hollow shaft and appendages and the fragments are moved through the vessel by appendages attached to the shaft having variable, pitched attachments mounted thereon.

28. A process as in claim 23 wherein the pyrolysis reaction vessel is indirectly heated.

29. A process as in claim 28 wherein the vessel is indirectly heated by a circulating molten salt mixture.

30. A process as in claim 29 wherein the fractionating of the second portion of the vapor phase comprises:
condensing at least one hydrocarbon fraction from said vapor phase; and
separating said fraction from the residual fuel gas.

31. A process as in claim 30 wherein said condensate and said hydrocarbon fraction are cooled by a combination of direct contact and indirect heat exchange.

32. A process as in claim 28 wherein the hydrocarbon atmosphere in the reaction vessel is isolated from air by the use of an inert purge gas seal and airlocks at the entry and discharge ports of the sealed reaction vessel.

33. A process as in claim 22 including cooling said partially pyrolyzed solid phase after it exits the pyrolysis reactor.

34. A process as in claim 33 wherein cooling of the pyrolyzed solid phase to less than 300° Fahrenheit is accomplished by passing said solid phase in indirect heat exchange with water.

35. A process as in claim 31 including
magnetically separating steel wire from the cooled, pyrolyzed solid phase;
physically separating trash from the solid phase by passing the solid phase through a relatively coarse screen of between 4 and 10 mesh;
discarding the trash; and
recycling at least a portion of the pyrolyzed material to the reaction vessel.

36. A process as in claim 22 including compressing said gas and burning at least a portion of said compressed gas to supply process heat.

37. A process as in claim 22 wherein the amount of the first portion is between all and five percent of the amount of the partially pyrolyzed solid phase produced from the reaction vessel.

* * * * *